(12) United States Patent
Liu et al.

(10) Patent No.: US 7,459,415 B1
(45) Date of Patent: Dec. 2, 2008

(54) LUBRICANT FOR THIN FILM STORAGE MEDIA

(75) Inventors: Jianwei Liu, Fremont, CA (US);
Michael Joseph Stirniman, Fremont, CA (US); Jing Gui, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 555 days.

(21) Appl. No.: 10/962,405

(22) Filed: Oct. 13, 2004

Related U.S. Application Data

(60) Division of application No. 10/836,943, filed on Apr. 30, 2004, now Pat. No. 6,916,531, which is a continuation of application No. 10/141,217, filed on May 7, 2002, now abandoned.

(60) Provisional application No. 60/347,161, filed on Jan. 9, 2002.

(51) Int. Cl.
*C10M 133/38* (2006.01)
*C10M 133/58* (2006.01)

(52) U.S. Cl. .............. 508/244; 508/259; 508/261; 508/269; 508/285; 546/267; 546/341; 548/365.4

(58) Field of Classification Search ............... 508/267, 508/261, 255, 256, 269, 285, 264, 582, 244, 508/259; 546/267, 341; 548/365.4
See application file for complete search history.

(56) References Cited

U.S. PATENT DOCUMENTS

| 4,757,145 | A | * | 7/1988 | Caporiccio et al. | 428/835.8 |
| 4,941,987 | A | * | 7/1990 | Strepparola et al. | 508/182 |
| 5,128,216 | A | * | 7/1992 | Ng | 428/835.7 |
| 5,225,549 | A | * | 7/1993 | Dekura | 544/208 |
| 5,965,496 | A | * | 10/1999 | Yamana et al. | 508/244 |
| 6,761,974 | B1 | * | 7/2004 | Liu et al. | 428/835.8 |
| 6,916,531 | B2 | * | 7/2005 | Liu et al. | 428/336 |

* cited by examiner

*Primary Examiner*—Ellen M. McAvoy
(74) *Attorney, Agent, or Firm*—Darby & Darby, P.C.

(57) ABSTRACT

Embodiments relate to lubricants disposed over magnetic storage media, such as rotatable thin film magnetic discs. One embodiment comprises a lubricant compound of a fluoropolyether chain having one or more carbonyl-imide pairs. For example, the carbonyl-imide pair may be located at one end, both ends, and/or in the middle of the fluoropolyether chain.

13 Claims, 2 Drawing Sheets

LUBRICANT FOR THIN FILM STORAGE MEDIA

CROSS-REFERENCE TO RELATED APPLICATIONS

This application is a division of U.S. Ser. No. 10/836,943, filed Apr. 30, 2004, which is a continuation of U.S. Ser. No. 10/141,217, filed May 7, 2002, which claims benefit to U.S. Provisional Application No. 60/347,161, filed Jan. 9, 2002, which is herein incorporated by reference.

BACKGROUND OF THE INVENTION

1. Field of the Invention

Embodiments of the present invention generally relate to lubricants. More particularly, embodiments relate to lubricants disposed over magnetic storage media, such as rotatable thin film magnetic discs.

2. Description of the Related Art

Information storage systems, such as disk drive memory systems, have been used in computers and other data processing devices for many years for storage of digital information. Typically, information is recorded on concentric memory tracks of a rigid magnetic storage medium, such as a disc, the actual information being stored in the form of magnetic transitions within the medium. The disc is typically comprised of a thin rigid substrate, an underlayer, a magnetic layer, and a protective overcoat. The discs are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information.

In the operation of typical disk drives, the read/write head slides against the surface of the disc as the disc starts to rotate. Upon reaching a predetermined rotational speed, the head floats in air at a predetermined distance from the surface of the disc where the head is maintained during reading and recording operations. The read/write head floats very close to the surface of the disc during movement to maximize the signal quality. Due to the spacing closeness, the head can make intermittent contact with the disc surface. The head also slides on the disc as the disc rotation stops.

To reduce the wear and material interaction on the surface of the disc, the disc further includes a lubricant topcoat typically applied over the protective overcoat. The lubricant is intended to reduce the wear of the interface between the read-write head and the disc, especially during start/stop cycles in which the head is in contact with the disc. The lubricant system typically comprises a mixture of a perfluoropolyether, such as "FOMBLIN® Z-DOL" available from Ausimont USA, a subsidiary of Montedison S.P.A. of Milan, Italy, and a catalytic blocking agent, such as the hexaphenoxy compound "X-1P" available from The Dow Chemical Company of Midland, MI. The perfluoropolyether provides lubrication of the disc while the catalytic blocking agent prevents catalytic decomposition of the perfluoropolyether. It is believed that the catalytic blocking agent prevents exposed metal sites of the head or of the disc from reacting with the perfluoropolyether.

One problem with the lubricant system including a mixture of a lubricant compound, such as a perfluoropolyether, and a catalytic blocking agent, such as a hexaphenoxy compound, is that the catalytic blocking agent may be immiscible with the lubricant compound and may form droplets of the catalytic blocking agent on the lubricant compound. This "phase separation" between the lubricant compound and the catalytic blocking agent may cause reduced protection of the lubricant compound by the catalytic blocking agent. Moreover, the droplets of the catalytic blocking agent at the surface of the disc may perturb the head during operation of the disk drive, thus, causing the head to improperly read or write to the disc.

Therefore, there is a continuing need for an improved lubricant system to be used with magnetic storage media.

SUMMARY OF THE INVENTION

Embodiments relate to lubricants disposed over magnetic storage media, such as rotatable thin film magnetic discs. One embodiment comprises a lubricant compound of a fluoropolyether chain having one or more carbonyl-imide pairs. In one aspect, the carbonyl-imide pair may be located at one end, both ends, and/or in the middle of the fluoropolyether chain. Another embodiment comprises a method of manufacturing a magnetic storage medium comprising forming a protective overcoat over a magnetic layer of the magnetic storage medium. Then, a lubricant topcoat is applied over the protective overcoat. The lubricant topcoat may comprise a fluoropolyether having one or more carbonyl-imide pairs. Still another embodiment comprises a magnetic storage medium including a carbon-overcoated magnetic layer and a lubricant topcoat formed over the carbon-overcoated magnetic layer. The lubricant topcoat may comprise a fluoropolyether having one or more carbonyl-imide pairs.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
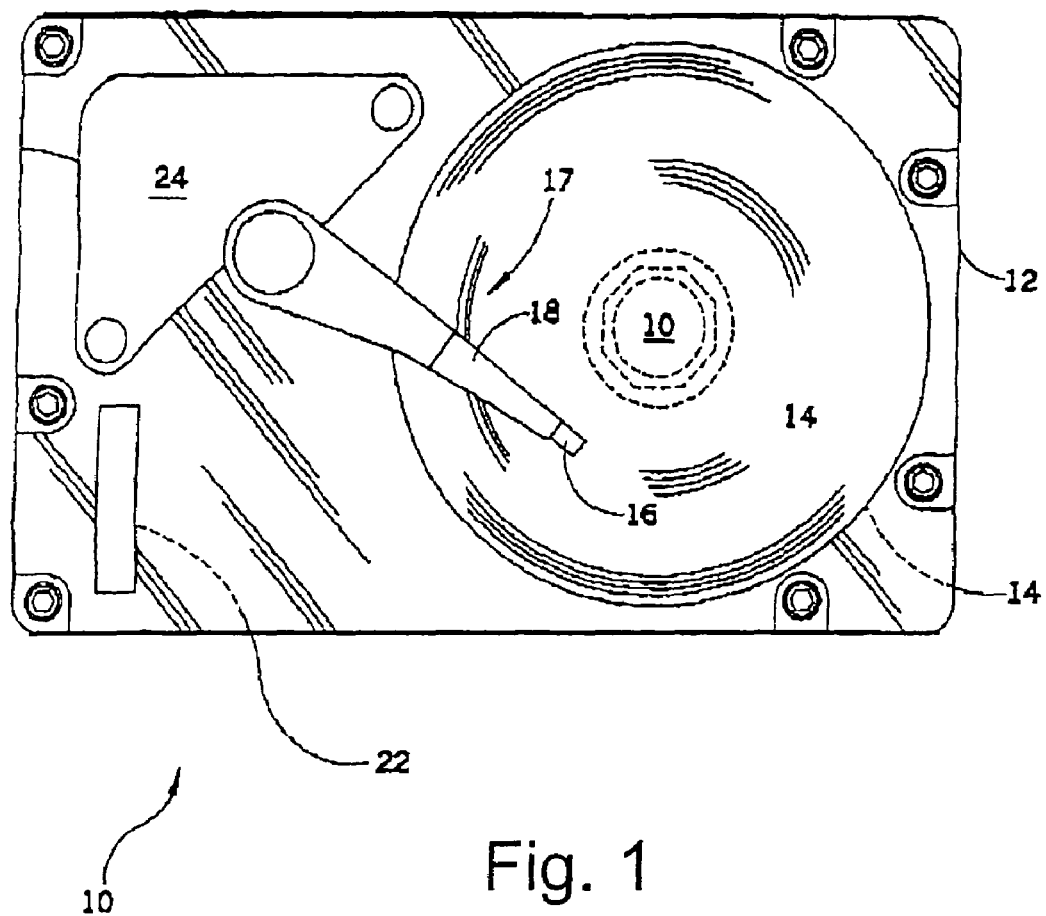
FIG. 1 is a simplified schematic top plan view of one exemplary embodiment of an information storage system.

FIG. 1 is a simplified schematic top plan view of one exemplary embodiment of an information storage system 10. The information storage system 10 may include a sealed housing 12, a magnetic storage medium 14 which is usually in the form of a disc or discs, a read/write head 16, and an actuator assembly 17. The actuator assembly 17 may include an actuator arm 18 for positioning the read/write head 16 disposed at the end of the actuator arm 18 over the surface of the storage medium 14. Multiple read/write heads may also be employed. The read/write head 16 carries a read/write element, which can be any type of read/write element known in the art, such as inductive thin film, MIG or MR. The storage medium 14, such as a disc or discs, may be mounted to a spindle motor 10 which spins the storage medium 14. The information storage system 10 may include a header assembly 22 to transfer electronic signals to and from a motor 24 which positions the actuator and the read/write head 16 as data is transferred to and from the storage medium 14. The information storage system 10 may be employed with a computer, printer or fax machine or other host system. Other embodiments of an information storage system may also be used.

Figure 2:
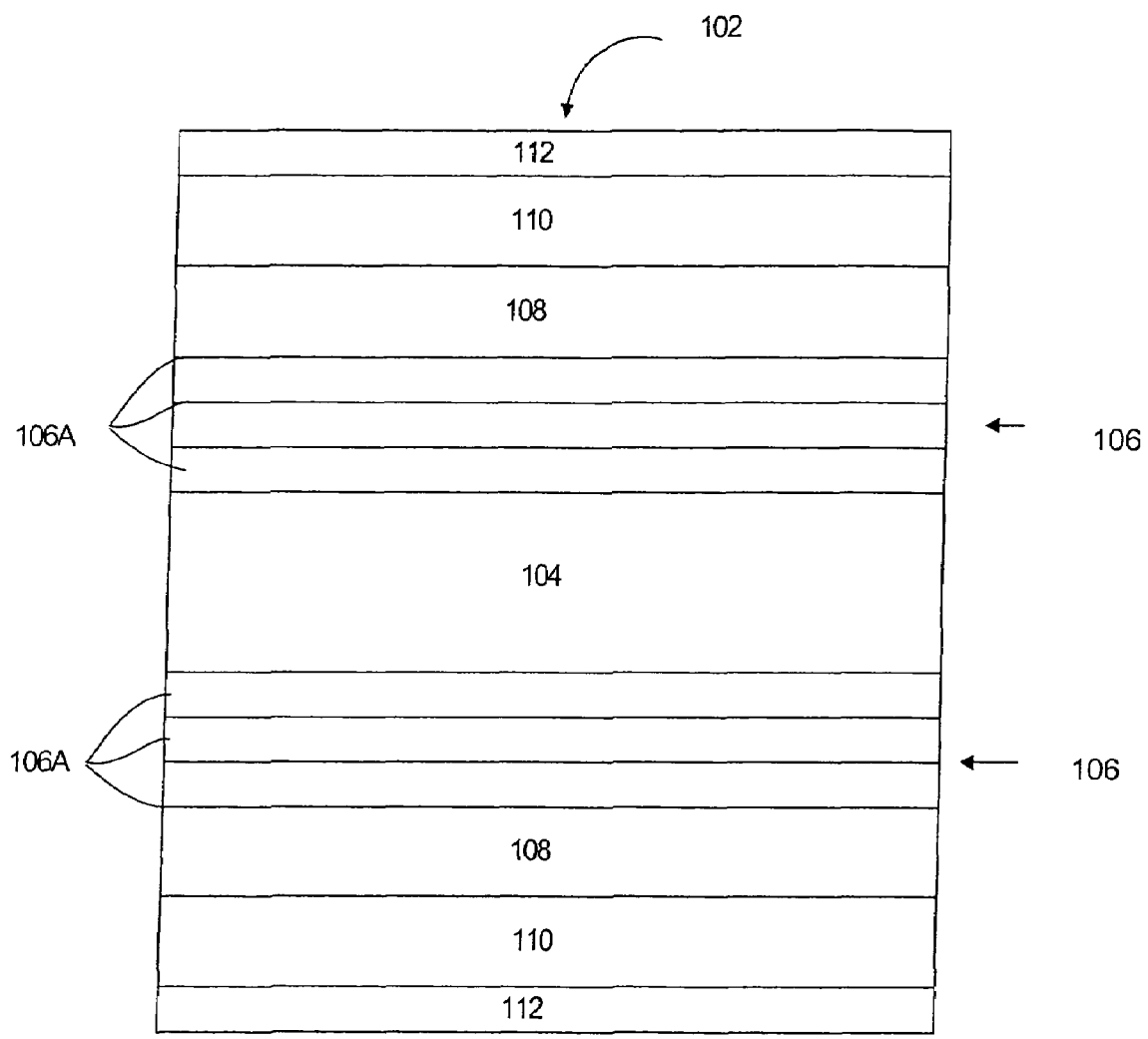
FIG. 2 is a schematic cross-sectional view of one exemplary embodiment of a magnetic storage medium.

FIG. 2 is a schematic cross-sectional view of one exemplary embodiment of a magnetic storage medium 102. The magnetic storage medium 102 includes a substrate 104. The substrate 104 typically comprises an aluminum (Al) alloy material, such as an aluminum-magnesium (Al—Mg) alloy, plated with an amorphous nickel-phosphorus layer. Alternatively, the substrate 104 may comprise other materials, such as glass, glass-ceramic, graphite materials, other materials, and combinations thereof. The substrate 104 may be textured or untextured. An underlayer 106, such as a chromium (Cr) or chromium alloy underlayer, may be formed over each side of the substrate 104. The underlayer 106 may be applied as a composite comprising a plurality of sub-layers 106A. A magnetic layer 108, such as a cobalt alloy magnetic layer, may be formed over the underlayer 106. A protective overcoat 110, such as a carbon overcoat, may be formed over the magnetic layer. The carbon overcoat may also incorporate other elements, such as hydrogen and/or nitrogen. A lubricant topcoat 112, such as a lubricant topcoat comprising the lubricant composition described in greater detail below, may be formed over the protective overcoat 110. The surface of the magnetic storage medium 112 may be textured or untextured. Also, separate textured data and landing zones may be provided on the surface of the disc. As shown in FIG. 2, the magnetic storage medium 112 includes thin film layers deposited on each side of the substrate 104. In other embodiments, thin film layers may be deposited on one side of the substrate 104. Other embodiments of a magnetic storage medium may also be used.

The lubricant composition, such as the lubricant composition of the lubricant topcoat in FIG. 2, includes a lubricant compound comprising a fluoropolyether chain having at least one carbonyl-imide pair. Preferably, the carbonyl-imide pair is a carbonyl-imide pair in which the nitrogen of the imide group is linked to the alpha position carbon of the carbonyl group. One embodiment of the lubricant compound comprises a fluoropolyether chain having a carbonyl-imide pair at one end of the fluoropolyether chain having the general structure of the formula:

(1)

in which $CI^1$ represents a carbonyl-imide pair and $FPE^1$ represent a fluoropolyether chain. Another embodiment of the lubricant compound comprises a fluoropolyether chain having a carbonyl-imide pair at both ends of the fluoropolyether chain having the general structure of the formula:

(2)

in which $CI^2$ and $CI^3$ each represents a carbonyl-imide pair, which may be the same or different, but are preferably the same, and in which $FPE^2$ represent a fluoropolyether chain.

In regards to formula (1) and formula (2), $CI^1$, $CI^2$, and $CI^3$ may each be any carbonyl-imide pair, preferably any carbon-imide pair having the nitrogen of the imide group linked to the alpha position carbon of the carbonyl group. Preferred embodiments of $CI^1$, $CI^2$, and $CI^3$ may each comprise a carbonyl-imide pair, having the nitrogen of the imide group linked to the alpha position carbon of the carbonyl group, represented by the general structure of the formula of $R^1=N-(CR^2R^3)-(CO)-$, $R^4=N-(NR^5)-(CO)-$, $R^6-N=(CR^7)-(Co)-$, or $R^8-N=N-(CO)-$ in which $R^1$ to $R^8$ are the same or different and may be an alkyl, alkenyl, alkoxy, aryl, aryloxy, arlyalkyl, arlyalkenyl, amine, imine, aromatic, or hetero cyclic aromatic group. $R^1$ to $R^8$ may be substituted or unsubstituted. Preferably, $R^1$ and $R^2$, $R^1$ and $R^3$, $R^4$ and $R^5$, or $R^6$ and $R^7$ together with the atoms binding them form a ring or rings system. More preferably, $R^1$ and $R^2$, $R^1$ and $R^3$, $R^4$ and $R^5$, or $R^6$ and $R^7$ together with the atoms binding them form an aromatic ring or rings system.

Examples of preferred embodiments of the carbonyl-imide pairs of $CI^1$, $CI^2$, and/or $CI^3$ having the general structure of the formula of $R^1=N-(CR^2R^3)-(Co)-$, $R^4=N-(NR^5)-(CO)-$, $R^6-N=(CR^7)-(CO)-$, $R^8-N=N-(CO)-$ include the following:

(A) 2-pyridinecarbonyl

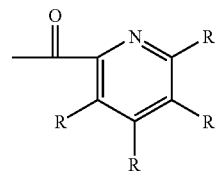

(B) 2-quinolinecarbonyl

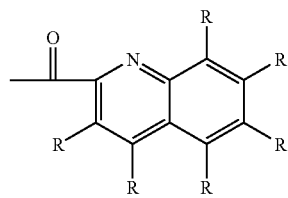

(C) 3-isoquinolinecarbonyl

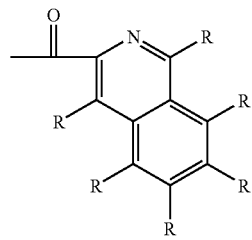

(D) 2-pyrimidinecarbonyl

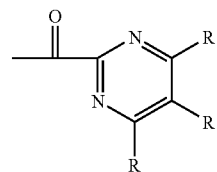

(E) 2-quinazolinecarbonyl

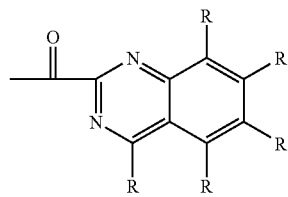

(F) 4-quinazolinecarbonyl

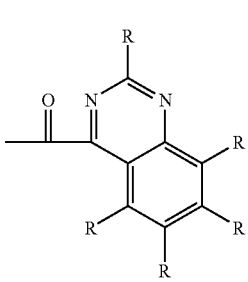

(G) 1-pyrazolecarbonyl

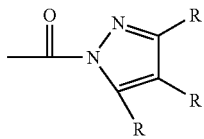

(H) 1-benzopyrazolecarbonyl

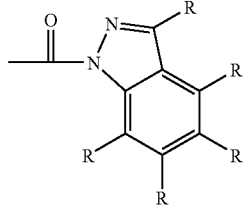

(I) 2-benzopyrazolecarbonyl

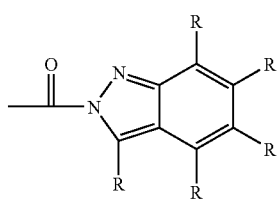

(J) 2-imidazolecarbonyl

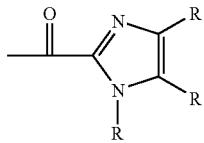

(K) 2-benzimidazolecarbonyl

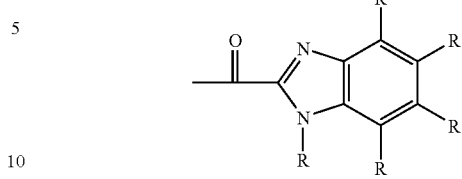

in which each R group may be the same or different and may be a hydrogen atom, halogen atom, alkyl, haloalkyl, alkenyl, haloalkenyl, alkoxy, haloalkoxy, aryl, haloaryl, arylalky, haloarylalky group, or other possible substituents.

In regards to formula (1) and formula (2), the fluoropolyether chain of $FPE^1$ and $FPE^2$ may be any fluoropolyether chain. In general, the fluoropolyether chain of $FPE^1$ and $FPE^2$ each comprise a chain having a middle section comprising perfluoroether units and end sections comprising any functional group. For example, $FPE^1$ and $FPE^2$ may each be represented by the general structure having the formula —$R^{11}$—$(OR^{12})_w$—$(OR^{13})_x$—$(OR^{14})_y$—O—$R^{15}$, in which $R^{12}$, $R^{13}$, $R^{14}$, are the same or different and may be a fluoroalkyl or perfluoroalkyl group, preferably a $C_{1-4}$ fluoroalkyl or perfluoroalkyl group. W may be between 1 and 500. X and Y are the same or different and may be between 0 and 500. $R^{11}$ comprises any functional group, such as one or more perfluoroether units, one or more partially fluorinated ether units, one or more non-fluorinated ether units, one or more hydroxy units, one or more fluoroalkyl units, one or more fluoroalkenyl units, other suitable functional groups, and combinations thereof. For $FPE^1$, $R^{15}$ may be a hydrogen, carboxylate, alkyl, haloalkyl, aryl, haloaryl, arylalky, haloarylalky, or piperonyl group. For $FPE^2$, $R^{15}$ comprises any functional group, such as one or more perfluoroether units, one or more partially fluorinated ether units, one or more non-fluorinated ether units, one or more hydroxy units, one or more fluoroalkyl units, one or more fluoroalkenyl units, other suitable functional groups combinations thereof. Examples of preferred embodiments of the fluoropolyether chain of $FPE^1$ and $FPE^2$ include a fluoropolyether chain having one or more of the following groups: (—O—$CF_2$)$_n$; (—O—$CF_2$—$CF_2$)$_n$; (—O—$CF_2$—$CF_2$—$CF_2$)$_n$; (—O—$CF_2$—CF($CF_3$))$_n$. For $FPE^1$, such fluoropolyether chains preferably include:

—$OCH_2CF_2$—(O—$CF_2$)$_p$—(O—$CF_2$—$CF_2$)$_q$—$OCF_2CH_2$—OH; and

—$OCH_2CF_2$—(O—$CF_2$—$CF_2$)$_q$—(O—$CF_2$)$_p$—$OCF_2CH_2$—OH;

in which Q and P may be the same or different and may be between 1 and 500. For $FPE^2$, such fluoropolyether chains preferably include:

—$OCH_2CF_2$—(O—$CF_2$)$_p$—(O—$CF_2$—$CF_2$)$_q$—$OCF_2CH_2$—O—;

in which Q and P may be the same or different and may be between 1 and 500. Other fluoropolyethers which may be used for $FPE^1$ and $FPE^2$, include the following and their derivatives thereof:

—(O—$CF_2$)$_p$—(O—$CF_2$—$CF_2$—)$_q$—O—$CF_3$;
—(O—$CF_2$—$CF_2$)$_q$—(O—$CF_2$)$_p$—O—$CF_3$;
—(O—$CF_2$)$_p$—(O—$CF_2$—CF($CF_3$))$_q$—O—$CF_3$;
—(O—$CF_2$—CF($CF_3$))$_q$—(O—$CF_2$)$_p$—O—$CF_3$;
—(O—$CF_2$—$CF_2$)$_p$—O—$CF_2$—$CF_3$;
—(O—$CF_2$—$CF_2$—$CF_2$)$_p$—O—$CF_2$—$CF_2$—$CF_3$;

—(O—CF$_2$—CF(CF$_3$))$_q$—O—CF$_2$—CF$_3$;
—(O)C(CF(CF$_3$)CF—O)$_q$—CF$_2$—CF$_2$—CF$_3$;

in which Q and P may be the same or different and may be between 1 and 500.

Preferred embodiments of the lubricant compound comprise a fluoropolyether chain having the carbonyl-imide pair at both ends of a fluoropolyether chain of formula (2). A particularly preferred embodiment of the lubricant compound comprises the compound termed "Pi—Z" of the general structure:

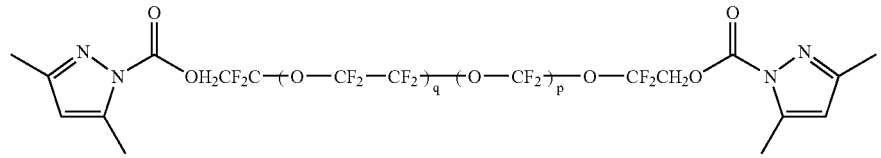

in which P and Q may be the same or different, but are preferably the same, and may be between 1 and 500. Another particularly preferred embodiment of the lubricant compound comprises the compound termed "Py—Z" of the general structure:

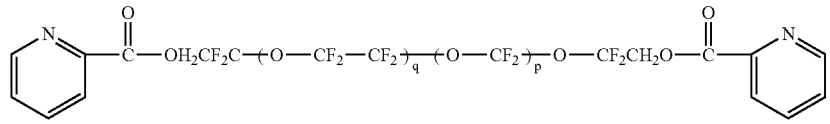

in which P and Q may be the same or different, but are preferably the same, and may be between 1 and 500.

Another embodiment of the present lubricant compound comprises a fluoropolyether chain having a carbonyl-imide pair at the middle of the fluoropolyether chain having the general structure of the formula:

FPE$^3$—CI$^4$—FPE$^4$   (3)

in which CI$^4$ represents a carbonyl-imide pair and FPE$^3$ and FPE$^4$ represent a fluoropolyether chain, which may be the same or different, but are preferably the same.

In regards to formula (3), CI$^4$ may be any carbonyl-imide pair, preferably any carbon-imide pair having the nitrogen of the imide group linked to the alpha position carbon of the carbonyl group. Preferred embodiments of CI$^4$ comprise a carbonyl-imide pair, having the nitrogen of the imide group linked to the alpha position carbon of the carbonyl group, represented by the general structure of the formula of —(C=O)—R$^{21}$=N—R$^{22}$—(C=O)—, in which R$^{21}$ and R$^{22}$ are the same or different and may be an alkyl, alkenyl, alkoxy, aryl, aryloxy, arlyalkyl, arlyalkenyl, amine, imine, aromatic, or hetero cyclic aromatic group. R$^{21}$ and R$^{22}$ may be substituted or unsubstituted. Preferably, R$^{21}$ and R$^{22}$ together with the atoms binding them form a ring or rings system. More preferably, R$^{21}$ and R$^{22}$ together with the atoms binding them form an aromatic ring or rings system.

An example of a preferred embodiment of a carbonyl-imide pair of CI$^4$ having the general structure of the formula of —(C=O)—R$^{21}$=N—R$^{22}$—(C=O)— include the following:

(J) 2,6-pyridine-biscarbonyl

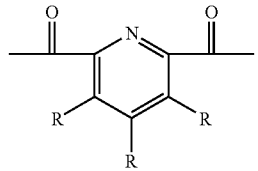

in which each R group may be the same or different and may be a hydrogen atom, halogen atom, alkyl, haloalkyl, alkenyl, haloalkenyl, alkoxy, haloalkoxy, aryl, haloaryl, arylalky, or haloarylalky group.

In regards to formula (3), the fluoropolyether chain of FPE$^3$ and FPE$^4$ may be any fluoropolyether chain. In general, the fluoropolyether chain of FPE$^3$ and FPE$^4$ each comprise a chain having a middle section comprising perfluoropolyether units and end sections comprising any functional group. For example, FPE$^3$ and FPE$^4$ may each be represented by general structure of the formula —R$^{31}$—(OR$^{32}$)$_w$—(OR$^{33}$)$_x$—(OR$^{34}$)$_y$—O—R$^{35}$, in which R$^{32}$, R$^{33}$, R$^{34}$, are different and may be a fluoroalkyl or perfluoroalkyl groups, preferably a C$_{14}$ fluoroalkyl or perfluoroalkyl group. W may be between 1 and 500. X and Y are the same or different and may be between 0 and 500. R$^{31}$ comprises any functional group, such as one or more perfluoroether units, one or more partially fluorinated ether units, one or more non-fluorinated ether units, one or more hydroxy units, one or more fluoroalkyl units, one or more fluoroalkenyl units, other suitable functional groups, or combinations thereof. R$^{35}$ may be a hydrogen, carboxylate, alkyl, haloalkyl, aryl, haloaryl, arylalky, haloarylalky, or piperonyl group. Examples of preferred embodiments of the fluoropolyether chain of FPE$^3$ and FPE$^4$ include a fluoropolyether chain having one or more of the following groups: (—O—CF$_2$)$_n$; (—O—CF$_2$—CF$_2$)$_n$; (—O—CF$_2$—CF$_2$—CF$_2$)$_n$; (—O—CF$_2$—CF(CF$_3$))$_n$. Such fluoropolyether chains preferably include:

—OCH$_2$CF$_2$—(O—CF$_2$)$_p$—(O—CF$_2$—CF$_2$)$_q$—OCF$_2$CH$_2$—OH; and

—OCH$_2$CF$_2$—(O—CF$_2$—CF$_2$)$_q$—(O—CF$_2$)$_p$—OCF$_2$CH$_2$—OH;

in which Q and P may be the same or different and may be between 1 and 500. Other fluoropolyethers which may be used for $FPE^3$ and $FPE^4$, include the following and their derivatives thereof:

—(O—$CF_2$)$_p$—(O—$CF_2$—$CF_2$—)$_q$—O—$CF_3$;
—(O—$CF_2$—$CF_2$)$_q$—(O—$CF_2$)$_p$—O—$CF_3$;
—(O—$CF_2$)$_p$—(O—$CF_2$—CF($CF_3$))$_q$—O—$CF_3$;
—(O—$CF_2$—CF($CF_3$))$_q$—(O—$CF_2$)$_p$—O—$CF_3$;
—(O—$CF_2$—$CF_2$—$CF_2$)$_p$—O—$CF_2$—$CF_3$;
—(O—$CF_2$—$CF_2$—$CF_2$)$_p$—O—$CF_2$—$CF_2$—$CF_3$;
—(O—$CF_2$—CF($CF_3$))$_q$—O—$CF_2$—$CF_3$;
—(O)—(CF($CF_3$)—CF—O)$_q$—$CF_2$—$CF_2$—$CF_3$;

in which Q and P may be the same or different and may be between 1 and 500. A particularly preferred embodiment of the lubricant compound comprises the compound termed "Pi-2Z" of the general structure:

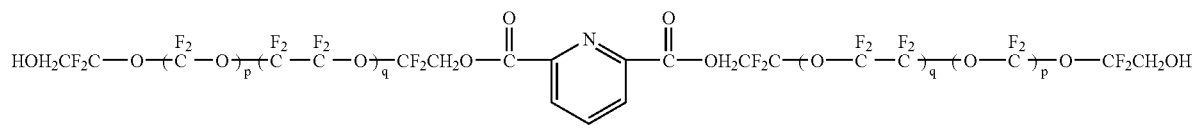

in which P and Q may be the same or different, but are preferably the same.

Other embodiments of the present lubricant compound are possible such as a fluoropolyether chain having a plurality of carbonyl-imide pairs. For example, the lubricant compound may comprise the general structure of the formula: Cl—FPE—Cl—FPE—Cl; Cl—FPE—Cl—FPE—Cl—FPE—Cl; and other possible structures. Embodiments of the present invention include fluoropolyether homopolymers, copolymers, random polymers, and block polymers. Different repeat units may be randomly distributed along the backbone of the fluoropolyether or distributed as a block of one type of repeat unit and subsequent blocks of different repeat units along the backbone of the fluoropolyether. The fluoropolyether can be completely fluorinated or partially fluorinated and can be linear or branched.

One example of the synthesis process for preparing Pi—Z comprises the following general equation:

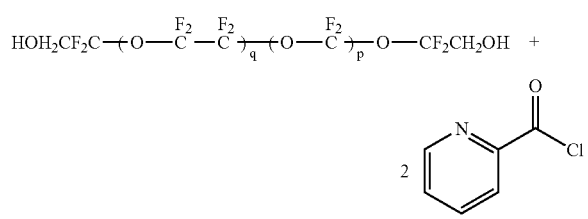

The process comprises dissolving "Zdeal" (10 g, 5 mmol), available from Ausimont, in a hydrofluorocarbon "Vertrel XF" (20 mL) available from DuPont Fluoroproducts, a division of E. I. du Pont de Nemours and Company of Wilmington, Del. Then, 2-pyridinecarboxylic chloride (1.56 g, 11 mmol) and 4-dimethylaminopyridine (0.1 g) in dichloromethane (10 mL) were added to the solution. Triethylamine was added in drop-wisely to the solution as an acid acceptor, and the mixture was allowed to react at room temperature for 4 hours. The solution was poured into Vertrel XF (100 mL) after it was cooled, and washed with a dilute HCl aqueous solution. A evaporation step followed by and a supercritical fluid extraction purification step provided a clear liquid product of Pi—Z fluoropolyether (8.5 g, 85%). The product was identified by UV spectra. Other synthesis processes for preparing Pi—Z are also possible.

One example of the synthesis process for preparing Py—Z comprises the following general equation:

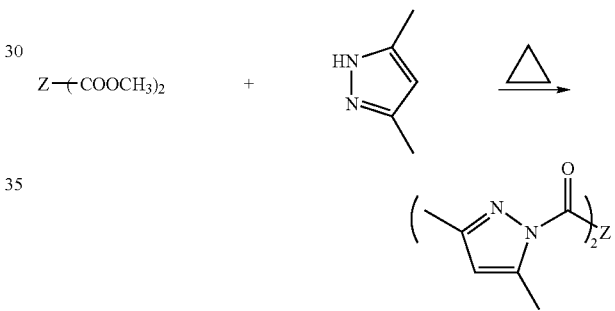

The process comprises dissolving Zdeal (10 g, 5 mmol) in a hydrofluorocarbon Vertrel XF (20 mL). Then, 3,5-dimethylpyrazole (1.44 g, 15 mmol) in methanol (10 mL) was added to the solution and the mixture was refluxed for 24 hours. The solution was poured into Vertrel XF (100 mL) after it was cooled, and washed with a dilute HCl aqueous solution. A evaporation step followed by a supercritical fluid extraction purification step gave of a clear liquid product of Py—Z fluoropolyether (8 g, 80%). The product was identified by UV spectra. Other synthesis processes for preparing PyZ are also possible.

The present lubricant compounds, whether of formula (1), formula (2), or formula (3), preferably have an average molecular weight ($M_n$) of between about 2,000 Daltons and

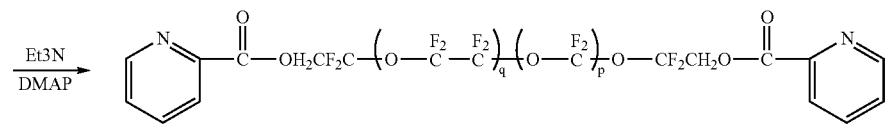

about 6,000 Daltons. The lubricant composition may be unfractionated. Alternatively, the lubricant composition may be fractioned. For example, the lubricant composition may be fractionated to remove certain molecular weight lubricant compounds. Not wishing to be bound by theory, it is believed that removing low molecular weight lubricant compounds provides a lubricant composition with improved stiction and wear properties at a very low topcoat thickness. The lubricant composition may be prepared by fractionating starting materials of fluoropolyethers or the end-product may be fractionated. Fractionating can be achieved by distillation, solvent extraction, chromatography, e.g. (HPLC), or other molecular weight separation techniques.

The lubricant composition may be applied over magnetic media by any technique known in the art, such as dip, vapor, spray, solvent, solvent-free, vacuum, and non-vacuum processes. The lubricant composition may be applied as one layer or as multiple layers. To provide desirable lubricating properties, the lubricant composition is preferably applied to a thickness between about 10 angstroms and about 30 angstroms. Thicknesses of less than 10 angstroms and greater than 30 angstroms of the lubricant composition may also be used. In addition, after application, a post-treatment of the lubricant topcoat may be performed, such as a heat, IR, UV, plasma, gas treatment, or other treatment known in the art.

Not wishing to be bound by theory, it is believed that the present lubricant compounds provide good lubrication properties, such as low stiction and friction properties while also being resistant to catalytic attack. The present lubricant compound incorporates the functional group of a catalytic blocking agent into the fluoropolyether chain. Therefore, it is believed that the present lubricant composition does not have phase separation problems of other lubricant mixture systems. In addition, since a separate catalytic blocking agent compound does not need to be provided in the lubricant system, the application process of the lubricant composition is simplified.

EXAMPLE

The following tests demonstrate the capabilities of the present invention and such examples are offered by way of illustration and not by way of limitation.

Example 1

Thermogravimetric analysis (TGA) tests were performed on samples comprising various lubricant systems. A first sample comprised a lubricant system of the mixture of FOMBLIN® Z-DOL with Irganox MD 1024 (available from Ciba-Geigy). A first comparative sample comprised a lubricant system of FOMBLIN® Z-DOL. Thermogravimetric analysis spectra showed that the first sample had a lower mass loss rate over temperature in comparison to the comparative sample. Not wishing to be bound by theory, it is believed that the TGA spectra showed that the Irganox MD 1024 of the first sample is capable of inhibiting catalytic decomposition of FOMBLIN® Z-DOL. It is further believed that the carbonyl-imide functional group, in which the nitrogen of the imide group is linked to the alpha position carbon of the carbonyl group, of the Irganox MD 1024 acts in blocking metal catalytic sites and incorporating this functional group into a fluoropolyether chain provides protection against catalytic attack.

Example 2

Potentiostatic corrosion tests were performed on samples comprising a substrate having a carbon overcoat with various lubricants formed thereover. A second sample comprised a substrate lubed with Pi—Z. A third sample comprised a substrate lubed with Pi-2Z. A second comparative sample comprised a substrate lubed with the mixture of FOMBLIN® Z-DOL and X1P. Each sample was immersed into a sodium chloride solution and was biased at a 900 mV potential for 10 minutes. The total amount of charge ("total corrosion charge") passing through each system over this 10 minutes period of time was measured and calculated. The total corrosion charge of the second sample and the third sample was less than the total corrosion charge of the second comparative sample. Therefore, the second sample and the third sample showed better potentiostatic corrosion resistance than the second comparative sample. Not wishing to be bound by theory, it is believed that the potentiostatic corrosion resistance data shows that the second sample and third sample is resistance to decomposition.

Example 3

Contact start-stop (CSS) tests were performed on samples comprising a disc having a carbon overcoat with various lubricants formed thereover. A fourth sample comprised a disc lubed with Pi—Z. A fifth sample comprised a disc lubed with Pi-2Z. A third comparative sample comprised a disc lubed with a mixture of FOMBLIN® Z-DOL and X1P.

Contact start-stop tests were performed in a conventional spin stand using 10,000 start/stop cycles in which the discs were spun to a speed of 7,200 rpm. Stiction and friction data were obtained at ambient temperature and ambient humidity. None of the samples "crashed." The fourth sample and the fifth sample showed low stiction and low friction values similar to the low stiction and low friction valves of the comparative sample. Not wishing to be bound by theory, it is believed that the CSS data shows that the fourth sample and the fifth sample provide good lubrication properties.

While the foregoing is directed to embodiments of the present invention, other and further embodiments of the invention may be devised without departing from the basic scope thereof, and the scope thereof is determined by the claims that follow.

The invention claimed is:

1. A lubricant composition, comprising a compound selected form the group consisting of Formula $CI^1$—$FPE^1$, Formula $CI^2$—$FPE^2$—$CI^3$, and Formula $FPE^3$—$CI^4$—$FPE^4$ wherein
   $FPE^1$, $FPE^2$, $FPE^3$, and $FPE^4$ are each a fluoropolyether chain and
   $CI^1$, $CI^2$, $CI^3$, and $CI^4$, are each a carbonyl-imide pair, wherein the nitrogen of the imide group is linked to an alpha position carbon of the carbonyl group and the fluoropolyether chain is attached to carbonyl-imide pair.

2. The lubricant composition of claim 1, wherein one carbonyl-imide pair is located at one end of the fluoropolyether chain.

3. The lubricant composition of claim 2, wherein another carbonyl-imide pair is located at the other end of the fluoropolyether chain.

4. The lubricant composition of claim 1, wherein at least one carbonyl-imide pair is located within the fluoropolyether chain.

5. The lubricant composition of claim 2, wherein at least one carbonyl-imide pair is located within the fluoropolyether chain.

6. The lubricant composition of claim 1, wherein the carbonyl-imide pair is selected from the group consisting of 2-pyridinecarbonyl, 2-quinolinecarbonyl, 3-isoquinolinecarbonyl, 2-pyrimidinecarbonyl, 2-quinazolinecarbonyl, 4-quinazolinecarbonyl, 1-pyrazolecarbonyl, 1-benzopyrazolecarbonyl, 2-benzopyrazolecarbonyl, 2-imidazolecarbonyl, 2-benzimidazolecarbonyl, 2,6-pyridine-biscarbonyl, and derivatives thereof.

7. A lubricant composition, comprising a compound selected form the group consisting of Formula $CI_1$—$FPE^1$, Formula $CI^2$—$FPE^2$—$CI^3$, and Formula $FPE^3$—$CI^4$—$FPE^4$, wherein each of $CI^1$, $CI^2$ and $CI_3$, are independently selected form the group consisting of

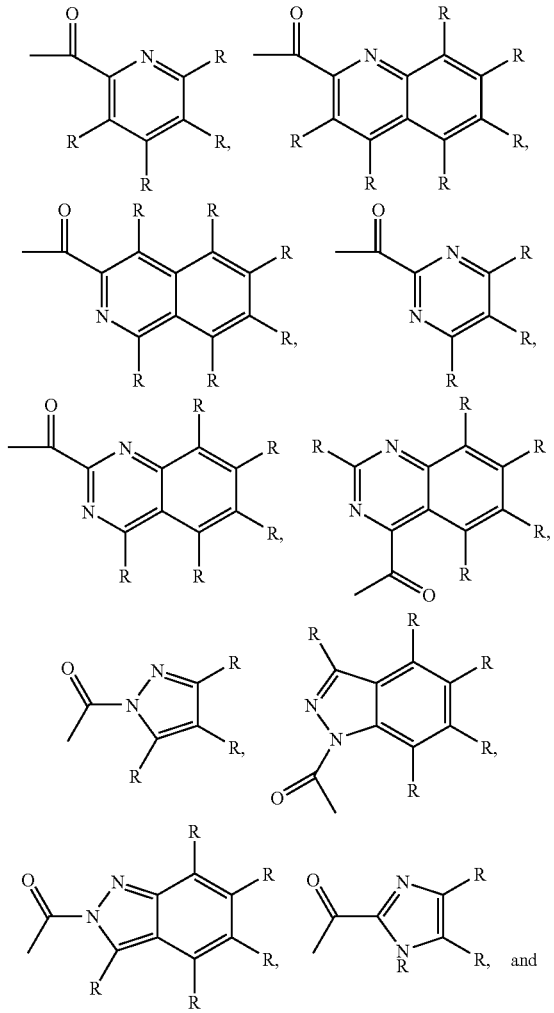

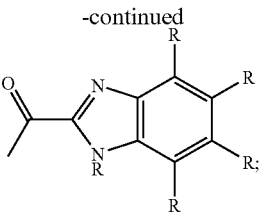

$CI^4$ is

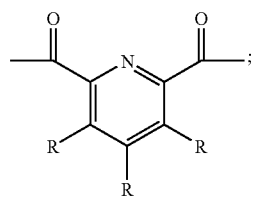

wherein
each R is independently selected from the group consisting of hydrogen, halogen, aqlkyl, haloalkyl, alkenyl, haloalkenyl, alkoxy, haloalkoxy, aryl, haloaryl, arylalkyl, and haloarylalkyl;

$FPE^1$, $FPE^3$, and $FPE^4$ are independently selected from the group consisting of —$OCH_2CF_2$—$(O$—$CF_2)_p$—$(O$—$CF_2$—$CF_2)_q$—$OCF_2CH_2$—$OH$, —$OCH_2CF_2$—$(O$—$CF_2$—$CF_2)_q$—$(O$—$CF_2)_p$—$OCF_2CH_2$—$OH$, —$(O$—$CF_2)_p$—$(O$—$CF_2$—$CF_2)_q$—$O$—$CF_3$, $(O$—$CF_2$—$CF_2)_q$ —$(O$—$CF_2)_p$—$O$—$CF_3$, $(O$—$CF_2)_p$—$(O$—$CF_2$—$CF(CF_3))_q$—$O$—$CF_3$, —$(O$—$CF_2$—$CF(CF_3))_q$—$(O$—$CF_2)_p$—$O$—$CF_3$, —$(O$—$CF_2$—$CF_2$—$CF_2)_p$—$O$—$CF_2$—$CF_3$, —$(O$—$CF_2$—$CF_2$—$CF_2)_p$—$O$—$CF_2$—$CF_2$—$CF_3$, —$(O$—$CF_2$—$CF(CF_3))_q$—$O$—$CF_2$—$CF_2$—$CF_3$, and —$(O)$—$(CF(CF_3)$—$CF$—$O)_q$—$CF_2$—$CF_2$—$CF_3$;

$FPE^2$ is —$OCH_2CF_2$—$(O$—$CF_2)_p$—$(O$—$CF_2$—$CF_2)_q$—$OCF_2CH_2$—$O$—;

q is from 1 to 500, and
p is from 1 to 500.

8. The lubricant composition of claim 7, wherein the compound is a compound of Formula $CI^1$—$FPE^1$.

9. The lubricant composition of claim 7, wherein the compound is a compound of Formula $CI^2$—$FPE^2$—$CI^3$.

10. The lubricant composition of claim 7, wherein the compound is a compound of Formula $FPE^3$-$CI^4$—$FPE^4$.

11. The lubricant composition of claim 9, wherein the compound of Formula $CI^2$—$FPE^2$—$CI^3$ is

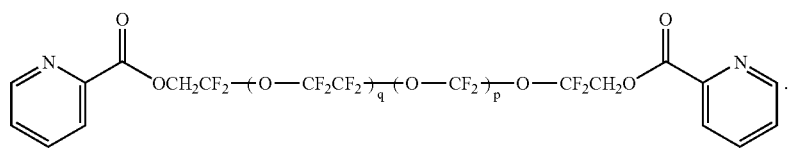

12. The lubricant composition of claim 9, wherein the compound of Formula $CI^2$—$FPE^2$—$CI^3$ is
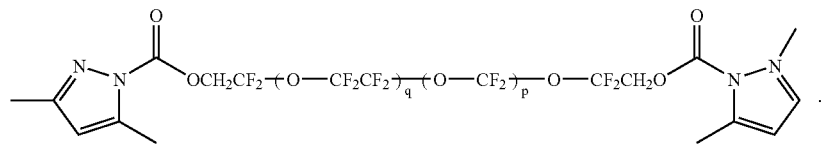
13. The lubricant composition of claim 10, wherein the compound of Formula $FPE^3$—$CI^4$—$FPE^4$ is
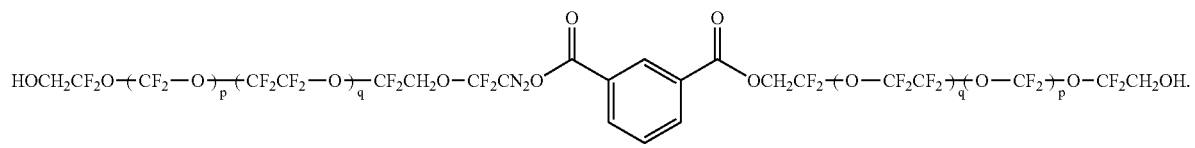
\* \* \* \* \*